United States Patent
Schreck et al.

(10) Patent No.: US 11,952,112 B2
(45) Date of Patent: Apr. 9, 2024

(54) WING FOR AN AIRCRAFT

(71) Applicant: Airbus Operations GmbH, Hamburg (DE)

(72) Inventors: Tobias Schreck, Achim (DE); Bernhard Schlipf, Bremen (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 17/734,861

(22) Filed: May 2, 2022

(65) Prior Publication Data
US 2022/0348307 A1  Nov. 3, 2022

(30) Foreign Application Priority Data
May 3, 2021 (EP) ..................................... 21171906

(51) Int. Cl.
 *B64C 3/38*  (2006.01)
 *B64C 9/06*  (2006.01)
 *B64C 13/38* (2006.01)

(52) U.S. Cl.
 CPC .................. *B64C 3/38* (2013.01); *B64C 9/06* (2013.01); *B64C 13/38* (2013.01)

(58) Field of Classification Search
 CPC .. B64C 13/30; B64C 3/38; B64C 9/06; B64C 13/38; B64C 13/341; B64D 2045/001
 See application file for complete search history.

(56) References Cited

U.S. PATENT DOCUMENTS

| | | | |
|---|---|---|---|
| 5,966,997 A | 10/1999 | Halm et al. | |
| 2011/0290946 A1* | 12/2011 | Peirce | B64C 9/22 244/213 |
| 2013/0087662 A1* | 4/2013 | Soenarjo | B64C 9/18 244/215 |

FOREIGN PATENT DOCUMENTS

| | | | | |
|---|---|---|---|---|
| CN | 109515687 A | * | 3/2019 | ............... B64C 9/16 |
| EP | 3 176 074 | | 6/2017 | |
| EP | 3176074 A1 | * | 6/2017 | ............. B64C 13/40 |
| EP | 3078596 B1 | * | 8/2018 | ......... B64D 45/0005 |
| EP | 3 378 762 | | 9/2018 | |
| WO | WO-9408808 A1 | * | 4/1994 | ............. B60G 11/30 |

OTHER PUBLICATIONS

Machine Translation of CN-109515687-A, Dong Y, Mar. 2019 (Year: 2019).*
Machine Translation of WO-9408808-A1, Runkel W, Apr. 1994 (Year: 1994).*
Extended European Search Report for Application No. EP 21171906. 7, 8 pages, dated Oct. 29, 2021.

* cited by examiner

*Primary Examiner* — Tien Q Dinh
*Assistant Examiner* — Katherine June Bolek
(74) *Attorney, Agent, or Firm* — Nixon & Vanderhye P.C.

(57) ABSTRACT

A wing for an aircraft is disclosed having a main wing, a high lift body, and a connection assembly movably connecting the high lift body to the main wing, such that the high lift body can be moved between a retracted position and at least one extended position. The connection assembly includes a drive system having a first drive unit and a second drive unit, wherein the first drive unit has a first input section coupled to a drive shaft, a first gear unit and a first output section drivingly coupled to the high lift body. The second drive unit has a second input section coupled to the drive shaft, a second gear unit, and a second output section drivingly coupled to the high lift body.

14 Claims, 3 Drawing Sheets

WING FOR AN AIRCRAFT

CROSS REFERENCE TO RELATED APPLICATION

This application claims priority to European Application Number EP21171906.7, filed May 3, 2021, the entire contents of which is hereby incorporated by reference.

BACKGROUND

The present invention relates to a wing for an aircraft, comprising a main wing and a high lift assembly. Further aspects of the invention relate to a high lift assembly for such a wing, as well as to an aircraft comprising such a wing and/or comprising such a high lift assembly.

The high lift assembly, which might be a leading edge high lift assembly or a trailing edge high lift assembly, comprises a high lift body, and a connection assembly for movably connecting the high lift body to the main wing, such that the high lift body can be moved relative to the main wing between a retracted position and at least one extended position. The high lift body is preferably formed as a slat or a droop nose in the case of a leading edge high lift assembly and is preferably formed as a flap in the case of a trailing edge high lift assembly.

The connection assembly comprises a drive system that is provided at, preferably fixedly mounted to, the main wing and that is connected to, preferably indirectly connected to, the high lift body for driving, i.e. initiating movement, of the high lift body between the retracted position and the extended position. The drive system comprises a first drive unit and a second drive unit spaced apart from one another in a wing span direction. The first drive unit is preferably formed as a geared rotary actuator (GRA) and has a first input section coupled to a drive shaft, a first gear unit, and a first output section drivingly coupled to the high lift body. The second drive unit is preferably formed as a geared rotary actuator (GRA) and has a second input section coupled to the drive shaft, a second gear unit, and a second output section drivingly coupled to the high lift body. The first and second gear units preferably transform high rotational speed with low torque from the first and second input sections, i.e. from the drive shaft, into low rotational speed with high torque at the first and second output sections.

The first output section comprises a rotatable first drive arm and the second output section comprises a rotatable second drive arm. The first drive arm is drivingly coupled to the high lift body via at least one first link element, preferably in the form of a drive strut, rotatably coupled to the first drive arm and rotatably mounted to the high lift body. The second drive arm is drivingly coupled to the high lift body via at least one second link element, preferably in the form of a drive strut, rotatably coupled to the second drive arm and rotatably mounted to the high lift body.

Such wings are known in the art. For the wings known in the art, skew cases are possible, where the first and second drive units do not move in sync and the high lift body might be skewed about a vertical axis. If one of the first and second drive units is blocked or moves slower than the other, e.g. due to failure, the other one of the first and second drive units might be transferring high actuating loads to the high lift body while skewed.

SUMMARY

The present invention contemplates preventing excessively high actuating loads during such skew cases of the high lift body.

A first link element comprises a first linear deformation element. Additionally or alternatively, the second link element comprises a second linear deformation element. The first linear deformation element and/or the second linear deformation element have a non-linear force-displacement characteristic. By such first and second linear deformation elements the force-displacement characteristic can be adapted such that actuating loads occurring during skew cases of the high lift body can be limited in an efficient way. Preferably, at a maximum displacement, i.e. at a maximum skew of the high lift body, the corresponding load transferred from the first or second drive unit to the high lift body is lower than in case of a linear force-displacement characteristic. Also, sizing loads for the high lift assembly can be essentially reduced.

According to an exemplary embodiment, the force-displacement characteristic of the first linear deformation element and/or of the second linear deformation element has a higher slope at lower forces, preferably below a predetermined threshold force, and has a lower slope at higher forces, preferably above the threshold force. In such a way, the maximum actuating load occurring during skew of the high lift body can be efficiently reduced.

According to an exemplary embodiment, the force-displacement characteristic of the first linear deformation element and/or of the second linear deformation element is linear, i.e. has a constant first slope, for forces below a threshold force. For forces above the threshold force the force-displacement characteristic of the first linear deformation element and/or of the second linear deformation element is non-linear, i.e. has at least one second slope different from the first slope. However, this does not mean that there necessarily needs to be a kink at the threshold force. Rather, the transition from the first slope to the second slope might be smooth and continuous. In such a way, the maximum actuating load occurring during skew of the high lift body can be efficiently reduced.

The threshold force may be between 100% and 150%, preferably between 110% and 130%, most preferred at about 120%, of the maximum force occurring during normal operation when both the first drive unit and the second drive unit are intact. Preferably, the first slope is at least 5 times higher, preferably at least 10 times higher, further preferred at least 20 times higher, yet further preferred at least 50 times higher, most preferred at least 100 times higher than the second slope. In such a way, above the threshold force there is only very little further increase in force with increasing displacement. However, the second slope might also be zero or might be negative, so that the force is constant or is decreasing after the threshold is reached. Also, it is possible that there is a third slope after the second slope which might be positive, negative, or zero.

According to an exemplary embodiment, the first linear deformation element and/or the second linear deformation element have a non-linear force-displacement characteristic with respect to forces applied to extend the high lift body, i.e. to move the high lift body from the retracted position to the extended position. At the same time, the first linear deformation element and/or the second linear deformation element have a linear, preferably entirely linear, force-displacement characteristic with respect to forces applied to retract the high lift body, i.e. to move the high lift body from the extended position to the retracted position. Such a force-displacement characteristic is particularly advantageous for leading edge high lift assemblies.

According to an exemplary embodiment, the first linear deformation element and/or the second linear deformation element have a non-linear force-displacement characteristic with respect to both forces applied to extend the high lift body and forces applied to retract the high lift body. Such a force-displacement characteristic is particularly advantageous for trailing edge high lift assemblies.

According to an exemplary embodiment, the first linear deformation element and/or the second linear deformation element is formed as or comprises a spring element preferably having a non-linear degressive stiffness. Preferably, the form, function, and/or material of the first linear deformation element and/or second linear deformation element is adapted to realize the non-linear force-displacement characteristic, preferably by the non-linear degressive stiffness. This can be done in various ways.

The spring element may have an adjustable or controllable stiffness. In such a way, the stiffness can be adjusted or controlled to have a non-linear degressive behaviour.

The spring element may be formed as a pneumatic spring or a hydro-pneumatic spring, preferably as a gas pressure spring. By such a spring element a non-linear force-displacement characteristic, in particular, a non-linear degressive stiffness can be efficiently realized.

According to an exemplary embodiment, the non-linear force-displacement characteristic of the first linear deformation element and/or the second linear deformation element is due to elastic deformation only. E.g., two elastically deformed components are provided which are both loaded below the threshold force while only one of which is loaded when loads increase above the threshold force. Alternatively, the non-linear force-displacement characteristic of the first linear deformation element and/or the second linear deformation element is due to a combination of elastic deformation and plastic deformation. E.g., only elastic deformation is present below the threshold force and plastic deformation alone or combined with elastic deformation is present when loads increase above the threshold force.

According to an exemplary embodiment, the high lift assembly is a leading edge high lift assembly and the high lift body is a leading edge high lift body, such as a slat or a droop nose. The non-linear force-displacement characteristic of the first linear deformation element and/or the second linear deformation element is particularly advantageous at the leading edge.

According to an exemplary embodiment, the high lift assembly is a trailing edge high lift assembly and the high lift body is a trailing edge high lift body, such as a flap, which might be driven e.g. by a ball-screw actuator. The non-linear force-displacement characteristic of the first linear deformation element and/or the second linear deformation element is also advantageous at the trailing edge.

According to an exemplary embodiment, the connection assembly comprises a first connection element and a second connection element for guiding the high lift body when moved between the retracted and extended positions. The first connection element is movably mounted to the main wing and is mounted, preferably fixedly and/or directly mounted, to the high lift body. The second connection element is movably mounted to the main wing and is mounted, preferably fixedly and/or directly mounted, to the high lift body in a position spaced apart from the first connection element in the wing span direction.

According to an exemplary embodiment, the first connection element is formed as a first track that is movably guided at the main wing and that is preferably fixedly mounted to the high lift body. Additionally or alternatively, the second connection element is formed as a second track that is movably guided at the main wing and that is preferably fixedly mounted to the high lift body. The first track and/or the second track are preferably in the form of an elongate support beam that is movable along the direction of its elongate extension, such as a slat track. Such first and second slat tracks can provide additional guidance of the high lift body.

According to an exemplary embodiment, the first connection element is formed as a first linkage, preferably comprising at least two link elements rotatably coupled to one another and rotatably coupled to both the main wing and the high lift body, preferably in the form of a four-bar linkage. Additionally or alternatively, the second connection element is formed as a second linkage, preferably comprising at least two link elements rotatably coupled to one another and rotatably coupled to both the main wing and the high lift body, preferably in the form of a four-bar linkage. Such first and second linkages can provide additional guidance of the high lift body.

According to an exemplary embodiment, the connection assembly further comprises one or more connection elements in the form of a track or in the form of a linkage. Preferably, the connection assembly comprises two further connection elements that are non-driven. Such further connection elements may provide further guidance of the high lift body.

A further aspect of the present invention relates to a high lift assembly for the wing according to any of the afore-described embodiments. The high lift assembly comprises a high lift body and a connection assembly for movably connecting the high lift body to a main wing, such that the high lift body can be moved between a retracted position and at least one extended position. The connection assembly comprises a drive system that is configured to be mounted to the main wing and that is connected to the high lift body for driving the high lift body between the retracted position and the extended position. The drive system comprises a first drive unit and a second drive unit spaced apart from one another in a wing span direction. The first drive unit has a first input section coupled to a drive shaft, a first gear unit and a first output section drivingly coupled to the high lift body. The second drive unit has a second input section coupled to the drive shaft, a second gear unit, and a second output section drivingly coupled to the high lift body. The first output section comprises a first drive arm and the second output section comprises a second drive arm.

The first drive arm is drivingly coupled to the high lift body via at least one first link element rotatably coupled to the first drive arm and mounted to the high lift body. The second drive arm is drivingly coupled to the high lift body via at least one second link element rotatably coupled to the second drive arm and mounted to the high lift body. The first link element comprises a first linear deformation element, and/or the second link element comprises a second linear deformation element. The first linear deformation element and/or the second linear deformation element have a non-linear force-displacement characteristic. Features and effects explained further above in connection with the wing apply vis-à-vis also in case of the high lift assembly.

A further aspect of the present invention relates to an aircraft comprising a wing according to any of the afore-described embodiments and/or comprising a high lift assembly according to any of the afore-described embodiments. Features and effects explained further above in connection with the wing and with the high lift assembly apply vis-à-vis also in case of the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
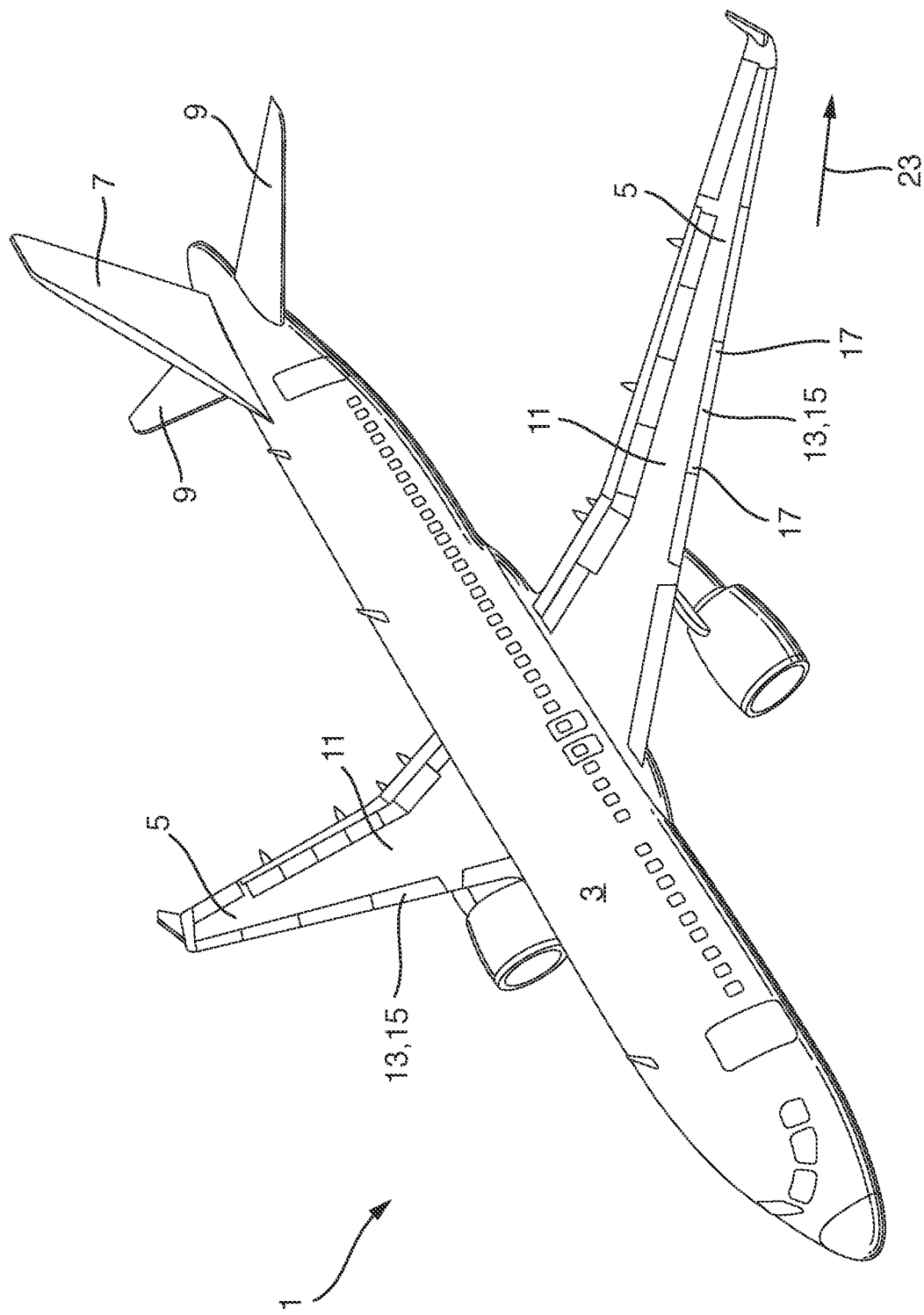
FIG. 1 is a perspective view of an aircraft according to an embodiment of the invention.
Figure 2:
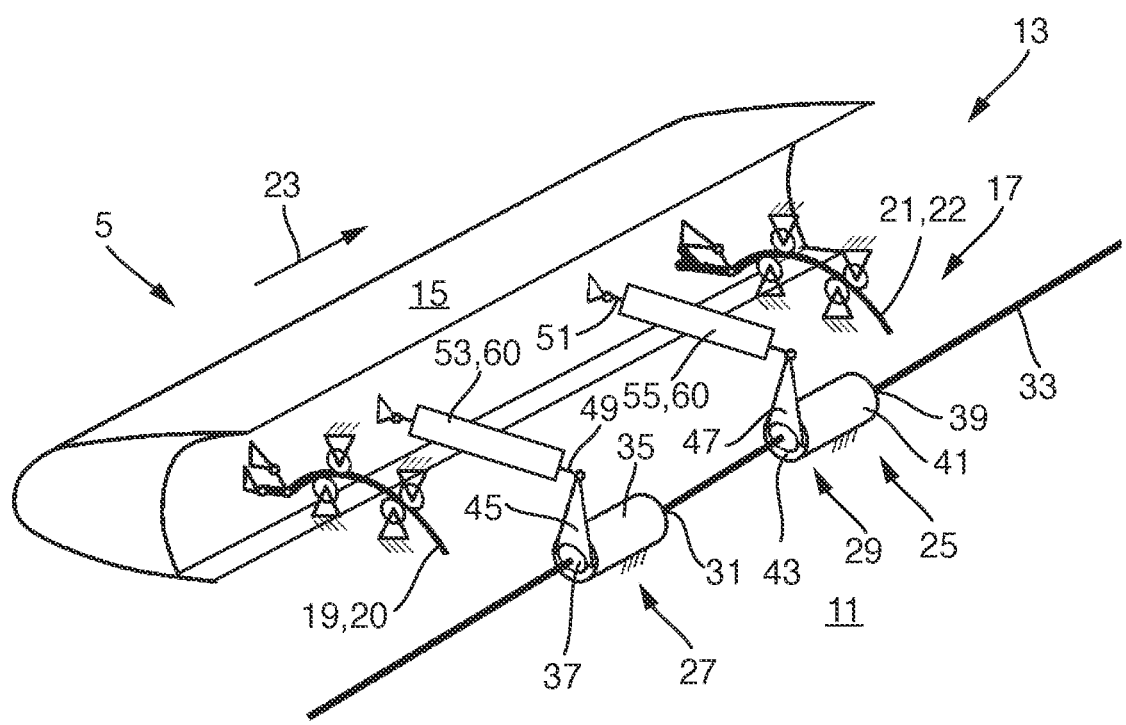
FIG. 2 is a perspective schematic view of a wing according to an embodiment of the invention; and, FIG. 3 is a plot of an exemplary force-displacement characteristic of the first or second linear deformation element shown in FIG. 2.
Figure 3:
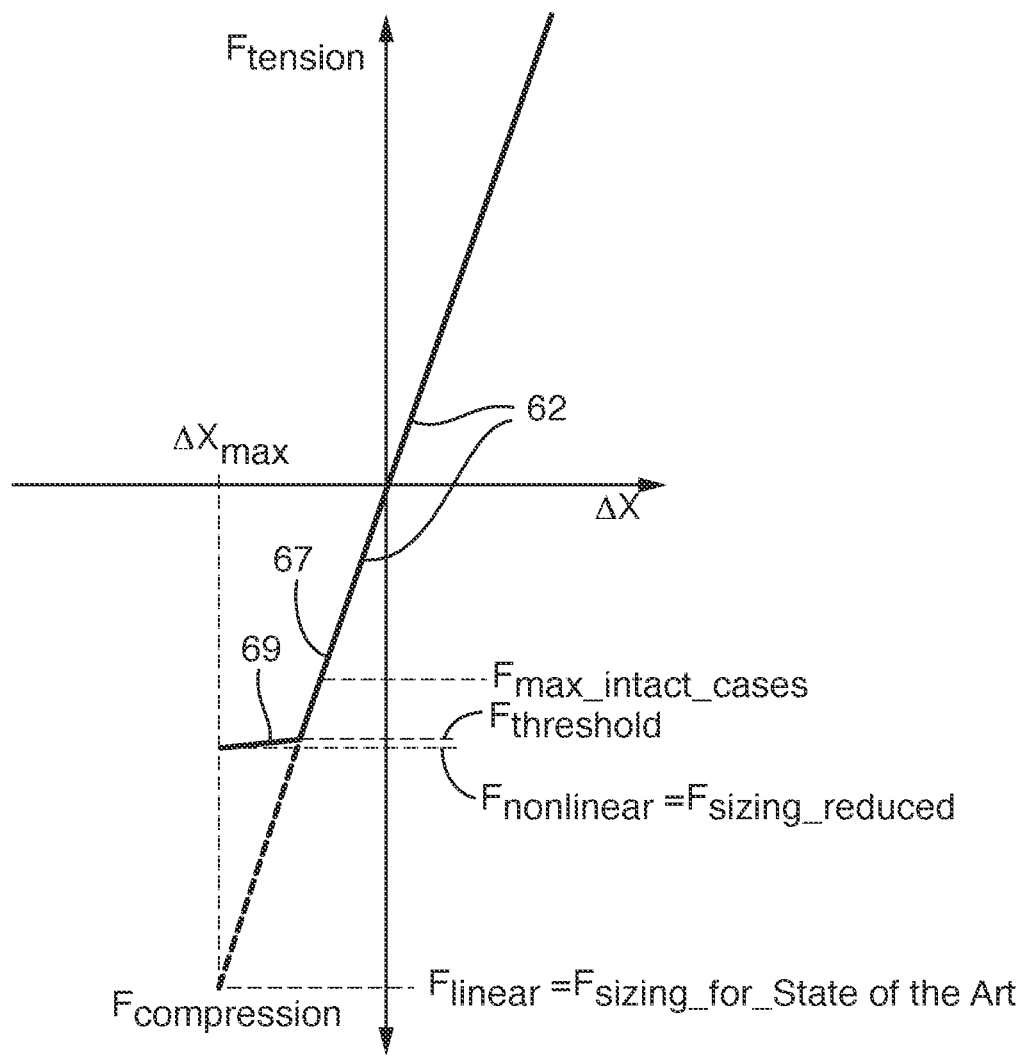

In FIG. 1 an embodiment of an aircraft 1 according to the present invention is illustrated. The aircraft 1 comprises a fuselage 3, wings 5, a vertical tail plane 7 and a horizontal tail plane 9. FIGS. 2 and 3 show details of the wings 5 of the aircraft 1.

FIG. 2 shows an embodiment of the wing 5 according to the invention. The wing 5 comprises a main wing 11 and a high lift assembly 13, in the present embodiment formed as a leading edge high lift assembly, movable relative to the main wing 11 to increase lift of the wing 5. The high lift assembly 13 comprises a high lift body 15 and a connection assembly 17. The high lift body 15 in the present embodiment is a leading edge high lift body, namely a slat. The connection assembly 17 is configured for connecting the high lift body 15 to the leading edge of the main wing 11 in such a way that the high lift body 15 is movable relative to the main wing 11 between a retracted position and at least one extended position.

The connection assembly 17 comprises a first connection element 19 and a second connection element 21. The first connection element 19 is movably mounted to the main wing 11 and is fixedly mounted to the high lift body 15. The second connection element 21 is movably mounted to the main wing 5 and is fixedly mounted to the high lift body 15 in a position spaced apart from the first connection element 19 in a wing span direction 23.

Further, the connection assembly 17 comprises a drive system 25 that is fixedly mounted to the main wing 11 and that is connected to the high lift body 15 for driving the high lift body 15 between the retracted position and the extended position. The drive system 25 comprises a first drive unit 27 and a second drive unit 29 spaced apart from one another in the wing span direction 23. The first drive unit 27 is formed as a geared rotary actuator (GRA) and has a first input section 31 coupled to a drive shaft 33, a first gear unit 35, and a first output section 37 drivingly coupled to the high lift body 15. The second drive unit 29 is formed as a geared rotary actuator (GRA) and has a second input section 39 coupled to the drive shaft 33, a second gear unit 41, and a second output section 43 drivingly coupled to the high lift body 15. The first and second gear units 35, 41 transform high rotational speed with low torque from the first and second input sections 31, 39, i.e. from the drive shaft 33, into low rotational speed with high torque at the first and second output sections 37, 43.

The first output section 37 comprises a rotatable first drive arm 45 and the second output section 43 comprises a rotatable second drive arm 47. The first drive arm is drivingly coupled to the high lift body 15 via a first link element 49 in the form of a drive strut rotatably coupled to the first drive arm 45 and rotatably mounted to the high lift body 15. The second drive arm 47 is drivingly coupled to the high lift body 15 via a second link element 51 in the form of a drive strut rotatably coupled to the second drive arm 47 and rotatably mounted to the high lift body 15. The first link element 49 comprises a first linear deformation element 53 and the second link element 51 comprises a second linear deformation element 55. The first linear deformation element 53 and the second linear deformation element 55 have a non-linear force-displacement characteristic 62.

The first connection element 19 is formed as a first track 20 that is movably guided at the main wing 11 and that is fixedly mounted to the high lift body 15. Additionally, the second connection element 21 is formed as a second track 22 that is movably guided at the main wing 11 and that is fixedly mounted to the high lift body 15. The first track 20 and the second track 22 are in the form of a slat track, i.e. in the form of an elongate support beam that is movable along the direction of its elongate extension.

As shown in FIG. 2, the first linear deformation element 53 and the second linear deformation element 55 are formed as a spring element 60 having a non-linear degressive stiffness. In the present embodiment, the spring element 60 is formed as a gas pressure spring. The spring element 60 is adapted such that the non-linear force-displacement characteristic 62 of the first linear deformation element 53 and of the second linear deformation element 55 is due to a combination of elastic deformation and plastic deformation. Specifically, when loading the spring element below a threshold force $F_{threshold}$, only elastic deformation is present. When loading the spring with forces above the threshold force $F_{threshold}$, plastic deformation of the spring is predominant, specifically by corresponding adaption the gas pressure.

As illustrated in FIG. 3, the force-displacement characteristic 62 of the first linear deformation element 53 and of the second linear deformation element 55 has a higher slope at lower forces below the threshold force $F_{threshold}$ and has a lower slope at higher forces above the threshold force $F_{threshold}$. The force-displacement characteristic 62 of the first linear deformation element 53 and of the second linear deformation element 55 is linear, i.e. has a constant first slope 67, for forces below a threshold force $F_{threshold}$. For forces above the threshold force $F_{threshold}$ the force-displacement characteristic 62 of the first linear deformation element 53 and of the second linear deformation element 55 is non-linear, i.e. has a second slope 69 different from the first slope 67. In the present embodiment, the threshold force $F_{threshold}$ is about 120% of the maximum force $F_{max-intact-cases}$ occurring during normal operation when both the first drive unit 27 and the second drive unit 29 are intact, which as illustrated in FIG. 3 in the present embodiment is between 90% and 95%, of the maximum force $F_{non-linear}$ associated with a maximum linear displacement $\Delta x_{max}$ of the first or second link element 49, 51 at a corresponding maximum skew displacement of the high lift body 15. In the present embodiment shown in FIG. 3, the first slope 67 is about 50 times higher than the second slope 69.

As shown in FIG. 3, the first linear deformation element 53 and the second linear deformation element 55 have a non-linear force-displacement characteristic 62 with respect to forces applied to extend the high lift body 15, i.e. to move the high lift body 15 from the retracted position to the extended position. At the same time, the first linear deformation element 53 and the second linear deformation element 55 have a linear force-displacement characteristic 62 with respect to forces applied to retract the high lift body 15, i.e. to move the high lift body 15 from the extended position to the retracted position.

By such a wing 5 the force-displacement characteristic 62 of the first and second linear deformation elements 53, 55 can be adapted such that actuating loads occurring during skew cases of the high lift body 15 can be limited in an efficient way. Also, sizing loads $F_{sizing}$ for the high lift assembly 13 can be essentially reduced.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing,
a high lift assembly comprising
a high lift body, and
a connection assembly movably connecting the high lift body to the main wing, such that the high lift body can be moved between a retracted position and at least one extended position,
wherein the connection assembly comprises a drive system that is mounted to the main wing and connected to the high lift body for driving the high lift body between the retracted position and the extended position,
wherein the drive system comprises a first drive unit and a second drive unit spaced apart from one another in a wing span direction,
wherein the first drive unit has a first input section coupled to a drive shaft, a first gear unit and a first output section drivingly coupled to the high lift body,
wherein the second drive unit has a second input section coupled to the drive shaft, a second gear unit, and a second output section drivingly coupled to the high lift body,
wherein the first output section comprises a first drive arm and the second output section comprises a second drive arm,
wherein the first drive arm is drivingly coupled to the high lift body via at least one first link element rotatably coupled to the first drive arm and mounted to the high lift body, and
wherein the second drive arm is drivingly coupled to the high lift body via at least one second link element rotatably coupled to the second drive arm and mounted to the high lift body,
wherein the first link element comprises a first linear deformation element configured to elastically and plastically deform, and/or
the second link element comprises a second linear deformation element configured to elastically and plastically deform, and
the first linear deformation element and/or the second linear deformation element have a non-linear force-displacement characteristic.

2. The wing according to claim 1, wherein the force-displacement characteristic of the first linear deformation element and/or of the second linear deformation element has a higher slope at lower forces and has a lower slope at higher forces.

3. The wing according to claim 1, wherein the force-displacement characteristic of the first linear deformation element and/or of the second linear deformation element is linear for forces below a threshold force,
wherein for forces above a threshold force the force-displacement characteristic of the first linear deformation element and/or of the second linear deformation element is non-linear.

4. The wing according to claim 3, wherein the threshold force ($F_{threshold}$) is between 100% and 150% of the maximum force ($F_{max\_intact\_cases}$) occurring during normal operation when both the first drive unit and the second drive unit are intact.

5. The wing according to claim 1, wherein the first linear deformation element and/or the second linear deformation element have a non-linear force-displacement characteristic with respect to both compression forces applied to extend the high lift body and tension forces applied to retract the high lift body.

6. The wing according to claim 1, wherein the first linear deformation element and/or the second linear deformation element is a spring element.

7. The wing according to claim 1, wherein the non-linear force-displacement characteristic of the first linear deformation element and/or the second linear deformation element is due to elastic deformation only or due to a combination of elastic deformation and plastic deformation.

8. The wing according to claim 1, wherein the high lift assembly is a trailing edge high lift assembly and the high lift body is a trailing edge high lift body.

9. The wing according to claim 1, wherein the connection assembly comprises a first connection element and a second connection element,
wherein the first connection element is movably mounted to the main wing and is mounted to the high lift body, and
wherein the second connection element is movably mounted to the main wing and is mounted to the high lift body in a position spaced apart from the first connection element in the wing span direction.

10. The wing according to claim 9, wherein the first connection element is formed as a first track that is movably guided at the main wing and that is mounted to the high lift body, and/or
wherein the second connection element is formed as a second track that is movably guided at the main wing and that is mounted to the high lift body.

11. The wing according to claim 9, wherein the first connection element is formed as a first linkage, and/or
wherein the second connection element is formed as a second linkage.

12. An aircraft comprising a wing according to claim 1.

13. The wing according to claim 3, wherein the threshold force ($F_{threshold}$) is between 110% and 130% of the maximum force ($F_{max\_intact\_cases}$) occurring during normal operation when both the first drive unit and the second drive unit are intact.

14. The wing according to claim 3, wherein the threshold force ($F_{threshold}$) is at about 120% of the maximum force ($F_{max\_intact\_cases}$) occurring during normal operation when both the first drive unit and the second drive unit are intact.

\* \* \* \* \*